US006826614B1

(12) United States Patent
Hanmann et al.

(10) Patent No.: US 6,826,614 B1
(45) Date of Patent: Nov. 30, 2004

(54) CACHING ADVERTISING INFORMATION IN A MOBILE TERMINAL TO ENHANCE REMOTE SYNCHRONIZATION AND WIRELESS INTERNET BROWSING

(75) Inventors: Jonathan Lee Hanmann, Corona, CA (US); Anil Sareem, Mission Viejo, CA (US); Kenneth J. Smith, Corona, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 756 days.

(21) Appl. No.: 09/848,797

(22) Filed: May 4, 2001

(51) Int. Cl.[7] .............................................. G06F 13/00
(52) U.S. Cl. ...................... 709/227; 709/203; 709/217; 709/219
(58) Field of Search ................................ 709/200, 201, 709/203, 217, 218, 219, 220, 224, 227, 229

(56) References Cited

U.S. PATENT DOCUMENTS

| | | | | |
|---|---|---|---|---|
| 5,572,643 A | * | 11/1996 | Judson ........................ | 709/218 |
| 5,809,242 A | | 9/1998 | Shaw et al. | |
| 5,978,381 A | * | 11/1999 | Perlman et al. .............. | 370/432 |
| 5,987,480 A | | 11/1999 | Donohue et al. | |
| 6,021,426 A | | 2/2000 | Douglis et al. | |
| 6,128,663 A | * | 10/2000 | Thomas ....................... | 709/228 |
| 6,141,010 A | | 10/2000 | Hoyle | |
| 6,157,946 A | | 12/2000 | Itakura et al. | |
| 6,379,251 B1 | * | 4/2002 | Auxier et al. ................. | 463/42 |
| 6,526,350 B2 | * | 2/2003 | Sekiyama .................... | 701/209 |
| 6,687,737 B2 | * | 2/2004 | Landsman et al. ........... | 709/203 |
| 6,738,808 B1 | * | 5/2004 | Zellner et al. ............... | 709/223 |

* cited by examiner

*Primary Examiner*—Moustafa M. Meky
(74) *Attorney, Agent, or Firm*—Milad G. Shara, Esq.; Howard H. Sheerin, Esq.

(57) ABSTRACT

A method and apparatus are disclosed for transmitting advertising information comprising a plurality of banner ads to a mobile terminal over a first connection during a synchronization session and storing the advertising information in a local memory of the mobile terminal. A web page is transmitted to the mobile terminal over a second connection, wherein the web page comprises web page content including a banner ad display area for displaying a banner ad. During a first time interval, a first one of the banner ads is retrieved from the local memory and the web page content is displayed on the screen of the mobile terminal together with the first one of the banner ads in the banner ad display area. During a second time interval, a second one of the banner ads is retrieved from the local memory and the web page content is displayed on the screen of the mobile terminal together with the second one of the banner ads in the banner ad display area.

65 Claims, 9 Drawing Sheets

CACHING ADVERTISING INFORMATION IN A MOBILE TERMINAL TO ENHANCE REMOTE SYNCHRONIZATION AND WIRELESS INTERNET BROWSING

BACKGROUND OF THE INVENTION

1. Field of the Invention

The present invention relates to mobile terminals. More particularly, the present invention relates to caching advertising information in a mobile terminal to enhance remote synchronization and wireless Internet browsing.

2. Description of the Prior Art

Mobile terminals, such as handheld computers, cellular phones, tablet computers, etc., may be used to browse Internet web sites by connecting to the Internet directly, or by viewing web pages that have been cached in the local memory of the mobile terminal during a synchronization session. FIG. 1 shows a prior art configuration for synchronizing a mobile terminal 2 to a target computer 4 over a direct, wired connection 6 (e.g., a USB connection). The target computer 4 downloads web pages from selected web sites off the Internet and transmits the web pages to the mobile terminal 2. The user is then able to view the web pages on the mobile terminal 2 while away from the target computer, such as while traveling. However, the web pages stored in the mobile terminal 2 may eventually become outdated and need to be refreshed through another synchronization session with the target computer 4. If the user is away from the target computer 4, the mobile terminal 2 must be synchronized remotely.

FIG. 2 shows prior art configurations for remotely synchronizing the mobile terminal 2 to the target computer 4 via the Internet 8. In one configuration, the mobile terminal 2 accesses the Internet 8 over a wired connection 10 (e.g., telephone lines) and an Internet service provider (ISP) 12. In another configuration, the mobile terminal 2 accesses the Internet over a wireless network such as a cellular provider network (CPN) 14 or a short range wireless access point (WAP) 15, such as Bluetooth, 802.11b, or HomeRF. In either case the bandwidth of the communication channel is typically much less as compared to the bandwidth of the direct, wired connection as in FIG. 1, thereby increasing the latency in accessing the data as well as decreasing battery life. Further, a CPN 14 typically charges a higher connection fee. It is therefore desirable to minimize the amount of information exchanged between the mobile terminal 2 and the target computer 4 when synchronizing remotely in order to minimize the synchronization time, conserve battery power, and minimize the connection fees.

Similarly, it is desirable to minimize the amount of information transmitted to the mobile terminal 2 while browsing the Internet over a low bandwidth (and potentially expensive) connection such as a wireless connection. The prior art has suggested to cache static information associated with a web site within the mobile terminal 2 and transmit only the dynamic information to reduce the amount of data transmitted to the mobile terminal. However, advertising information in this context is considered dynamic information since it is updated on a periodic basis (e.g., banner ads are rotated).

FIG. 3 illustrates a prior art mobile terminal displaying advertising information in the form of banner ads 16A and 16B which may be any geometric shape (e.g., rectangular or square) and which typically comprise an image such as a .JPG or .GIF image file. When the user clicks on the banner ad, a web page is displayed having information related to the product or services advertised. Although the banner ads are typically compressed, they contain a relatively large number of bytes as compared to other web page content such as text. Banner ads are also evolving into larger formats with richer content such as animated .GIF files, which consume even more memory. The click-through rate of banner ads is also typically very low (e.g., less than two percent) although still high enough to justify the expense for advertisers. Thus, bandwidth is consumed to transmit the banner ads to the mobile terminal during a remote synchronization or wireless browsing session even though a majority of the time the user will not click on the banner ads.

Yet another drawback associated with banner ads is the delay associated with downloading the banner ads from banner servers. Many Internet web sites use an advertising agency to "serve" the banner ads with the site's content. This minimizes the overhead associated with managing banner ads while still generating revenue for the web site. Each time the web site displays a web page, a banner ad is downloaded from a banner server of the advertising agency and displayed within the web page. However, the banner servers are often saturated with thousands of requests to serve banner ads, thereby delaying the transmission of the web page to the user.

There is, therefore, a need to enhance the performance in transmitting information to a mobile terminal, particularly with respect to synchronizing remotely or browsing the Internet wirelessly, so as to minimize the access latency, conserve battery power, and minimize connection fees.

SUMMARY OF THE INVENTION

The present invention may be regarded as a method of operating a mobile terminal comprising a local memory and a screen. During a synchronization session advertising information comprising a plurality of banner ads is received over a first connection and stored in the local memory of the mobile terminal. A web page is received over a second connection, wherein the web page comprises web page content including a banner ad display area for displaying a banner ad. During a first time interval, a first one of the banner ads is retrieved from the local memory and the web page content is displayed on the screen of the mobile terminal together with the first one of the banner ads in the banner ad display area. During a second time interval, a second one of the banner ads is retrieved from the local memory and the web page content is displayed on the screen of the mobile terminal together with the second one of the banner ads in the banner ad display area.

In one embodiment the first connection operates at a first bandwidth, the second connection operates at a second bandwidth, and the first bandwidth is substantially greater than the second bandwidth. For example, in one embodiment the first connection comprises a wired connection and the second connection comprises a wireless connection In yet another embodiment the advertising information comprises advertising display criteria for displaying the advertising information within the web page content. In an alternative embodiment the web page further comprises advertising display criteria for displaying the advertising information within the web page content.

In one embodiment during the synchronization session personal information management (PIM) data is transmitted to the remote terminal.

In one embodiment the plurality of banner ads are displayed with the web page content in a predetermined rotation. In one embodiment, a type indicator is associated with each banner ad wherein the type indicator is used to select a banner ad from the local memory for display with the web page content.

In one embodiment the web page is transmitted to the mobile terminal over the second connection during a subsequent synchronization session. In an alternative embodiment the web page is transmitted to the mobile terminal over the second connection during a browsing session.

In one embodiment during the synchronization session the inventory of advertising information stored in the local memory of the mobile terminal is evaluated, and updated advertising information is selectively transmitted to the mobile terminal relative to the inventory of advertising information. In one embodiment the updated advertising information displaces outdated advertising information stored on the mobile terminal.

In another embodiment, the local memory of the mobile terminal stores tracking information identifying the advertising information retrieved from the local memory and displayed with the web page content, wherein the tracking information is transmitted from the mobile terminal to a target computer. In one embodiment, the tracking information further comprises click-through data indicating a click-through rate for the advertising information displayed with the web page content.

In yet another embodiment, the advertising information comprises linked web pages wherein during the synchronization session, the linked web pages are transmitted to the mobile terminal over the first connection and stored in the local memory.

The present invention may also be regarded as a mobile terminal for communicating with a target computer. The mobile terminal comprises a local memory for storing advertising information comprising a plurality of banner ads received from the target computer over a first connection during a synchronization session, and a screen. The mobile terminal further comprises a terminal controller for receiving a web page over a second connection, wherein the web page comprises web page content including a banner ad display area for displaying a banner ad. During a first time interval, a first one of the banner ads is retrieved from the local memory and the web page content is displayed on the screen of the mobile terminal together with the first one of the banner ads in the banner ad display area. During a second time interval, a second one of the banner ads is retrieved from the local memory and the web page content is displayed on the screen of the mobile terminal together with the second one of the banner ads in the banner ad display area.

The present invention may also be regarded as a computer program embodied on a computer readable storage medium for use in a mobile terminal comprising a local memory and a screen. The computer program comprises code segments for:

during a synchronization session, receiving advertising information comprising a plurality of banner ads over a first connection and storing the advertising information in the local memory of the mobile terminal;

receiving a web over a second connection, wherein the web page comprises web page content including a banner ad display area for displaying a banner ad;

during a first time interval, retrieving a first one of the banner ads from the local memory and displaying the web page content on the screen of the mobile terminal together with the first one of the banner ads in the banner ad display area; and during a second time interval, retrieving a second one of the banner ads from the local memory and displaying the web page content on the screen of the mobile terminal together with the second one of the banner ads in the banner ad display area.

The present invention may also be regarded as a method of transmitting data to a mobile terminal, the mobile terminal comprising a local memory and a screen. During a synchronization session, advertising information comprising a plurality of banner ads is transmitted to the mobile terminal over a first connection, wherein the local memory of the mobile terminal is for storing the advertising information. A web page is transmitted to the mobile terminal over a second connection, wherein the web page comprises web page content including a banner ad display area. The screen of the mobile terminal is for displaying the web page content, wherein the banner ad display area is for displaying a first one of the banner ads retrieved from the local memory of the mobile terminal during a first time interval and for displaying a second one of the banner ads retrieved from the local memory of the mobile terminal during a second time interval.

The present invention may also be regarded as computer program embodied on a computer readable storage medium for transmitting data to a mobile terminal, the mobile terminal comprising a local memory and a screen. The computer program comprises code segments for:

during a synchronization session, transmitting advertising information comprising a plurality of banner ads to the mobile terminal over a first connection, wherein the local memory of the mobile terminal is for storing the advertising information; and transmitting a web page to the mobile terminal over a second connection, wherein:
  the web page comprises web page content including a banner ad display area;
  the screen of the mobile terminal is for displaying the web page content; and
  the banner ad display area is for displaying a first one of the banner ads retrieved from the local memory of the mobile terminal during a first time interval and for displaying a second one of the banner ads retrieved from the local memory of the mobile terminal during a second time interval.

DESCRIPTION OF THE PREFERRED EMBODIMENTS

Figure 1:
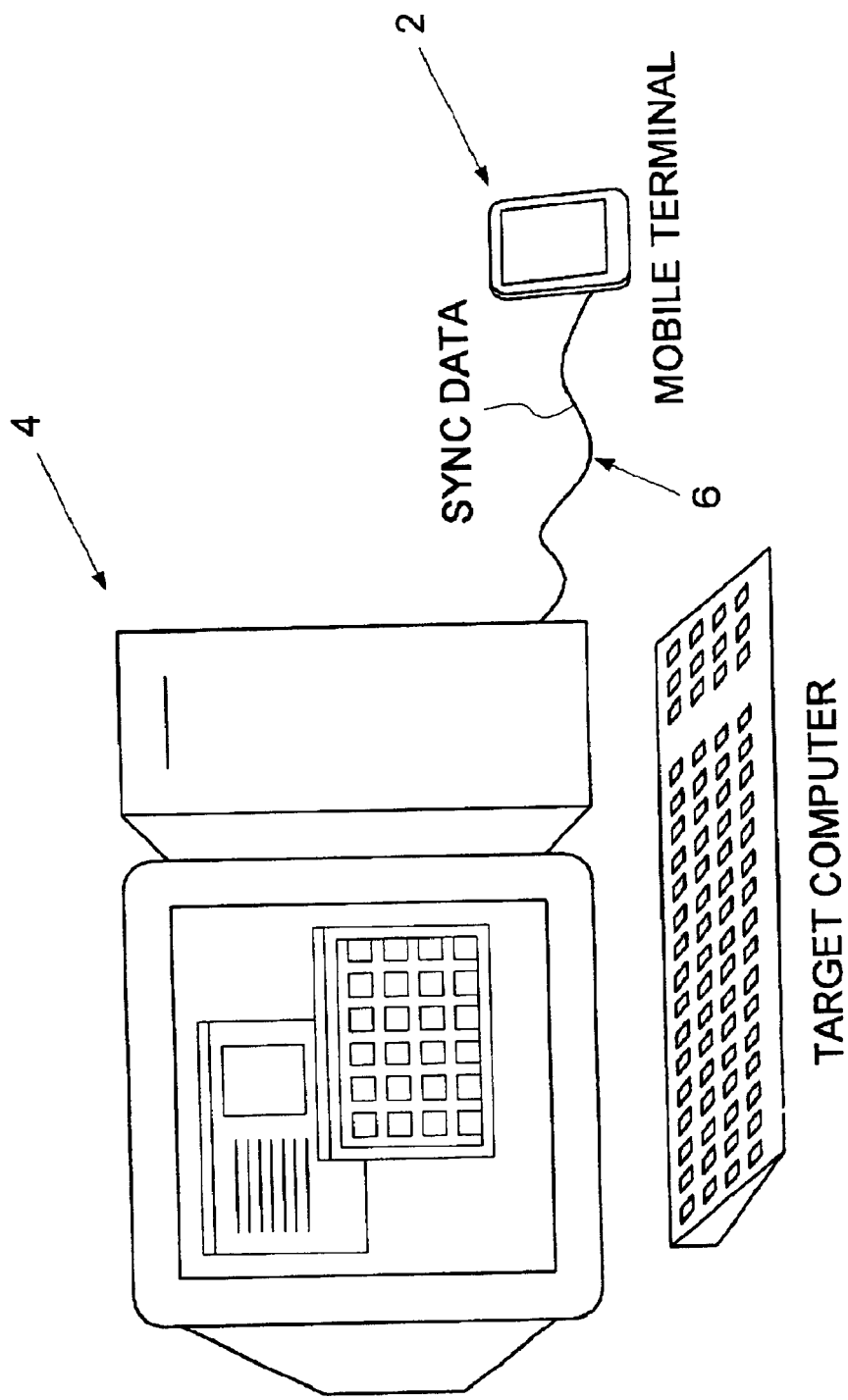
FIG. 1 shows a prior art configuration wherein a mobile terminal is synchronized to a target computer over a direct wired connection.
Figure 2:
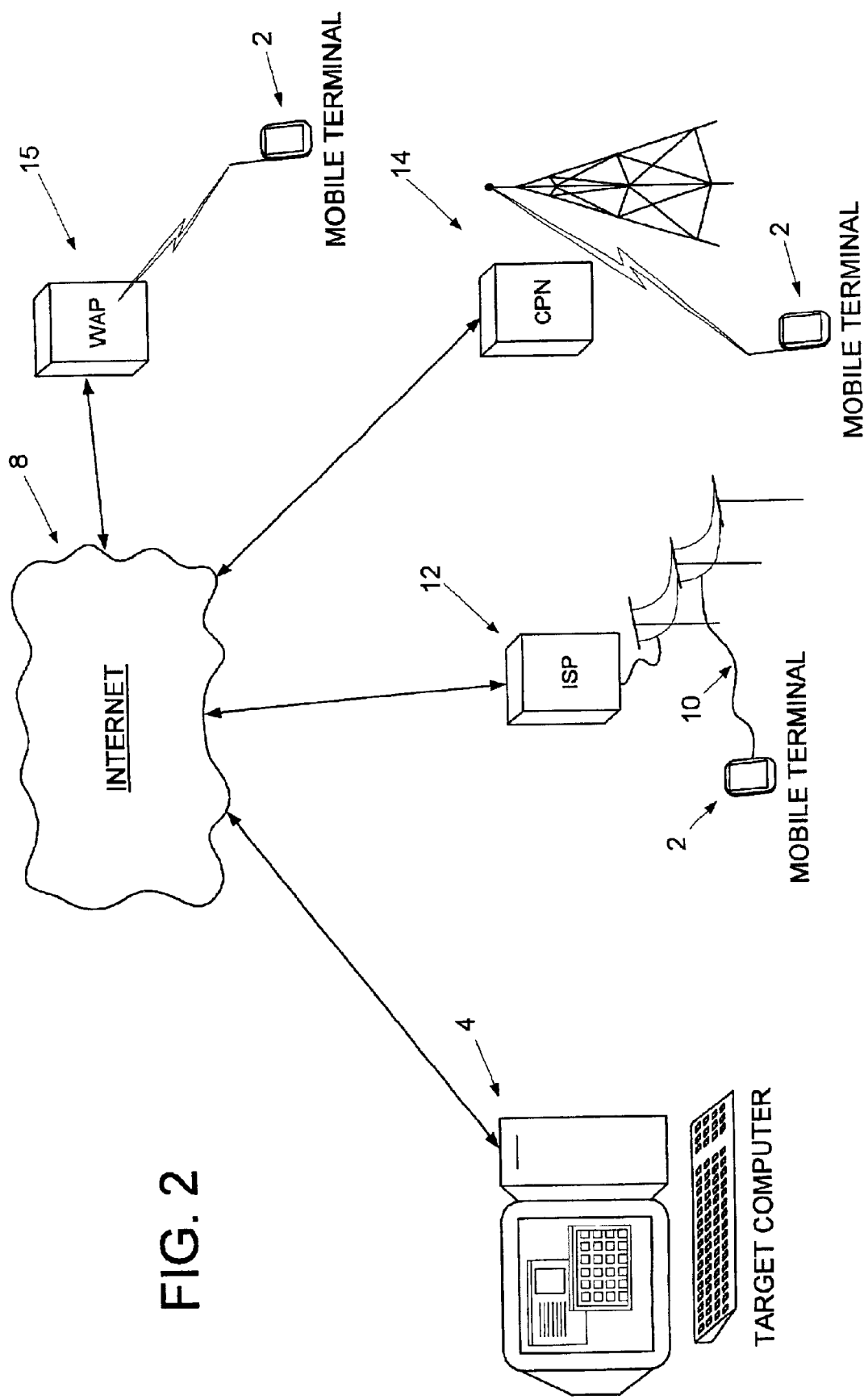
FIG. 2 shows a prior art configuration wherein a mobile terminal is synchronized remotely to the target computer over telephone land lines or over a wireless network via the Internet.
Figure 3:
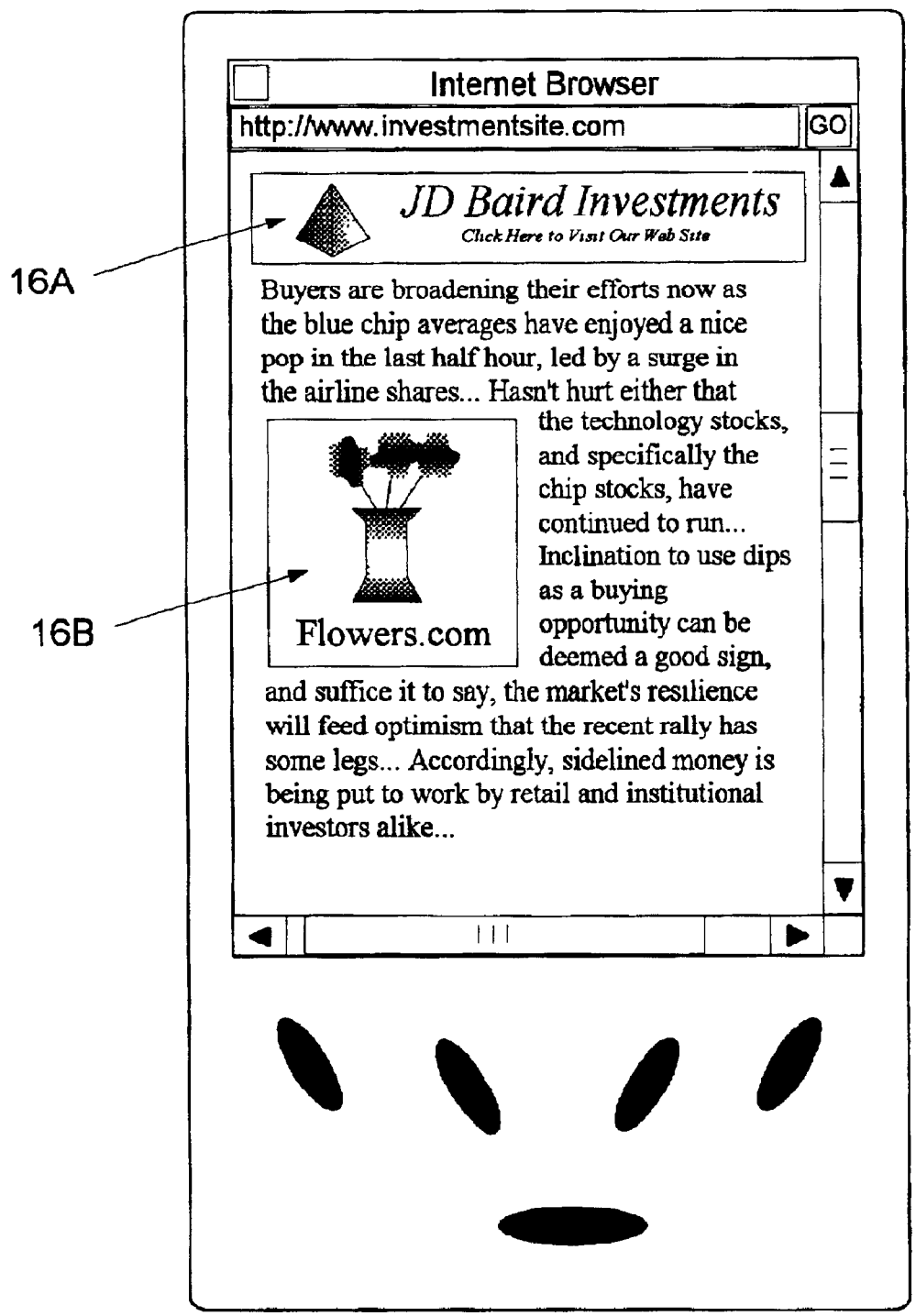
FIG. 3 shows a prior art mobile terminal for displaying advertising information, such as banner ads, together with web page content downloaded from the Internet or from a target computer during a remote synchronization session.
Figure 4:
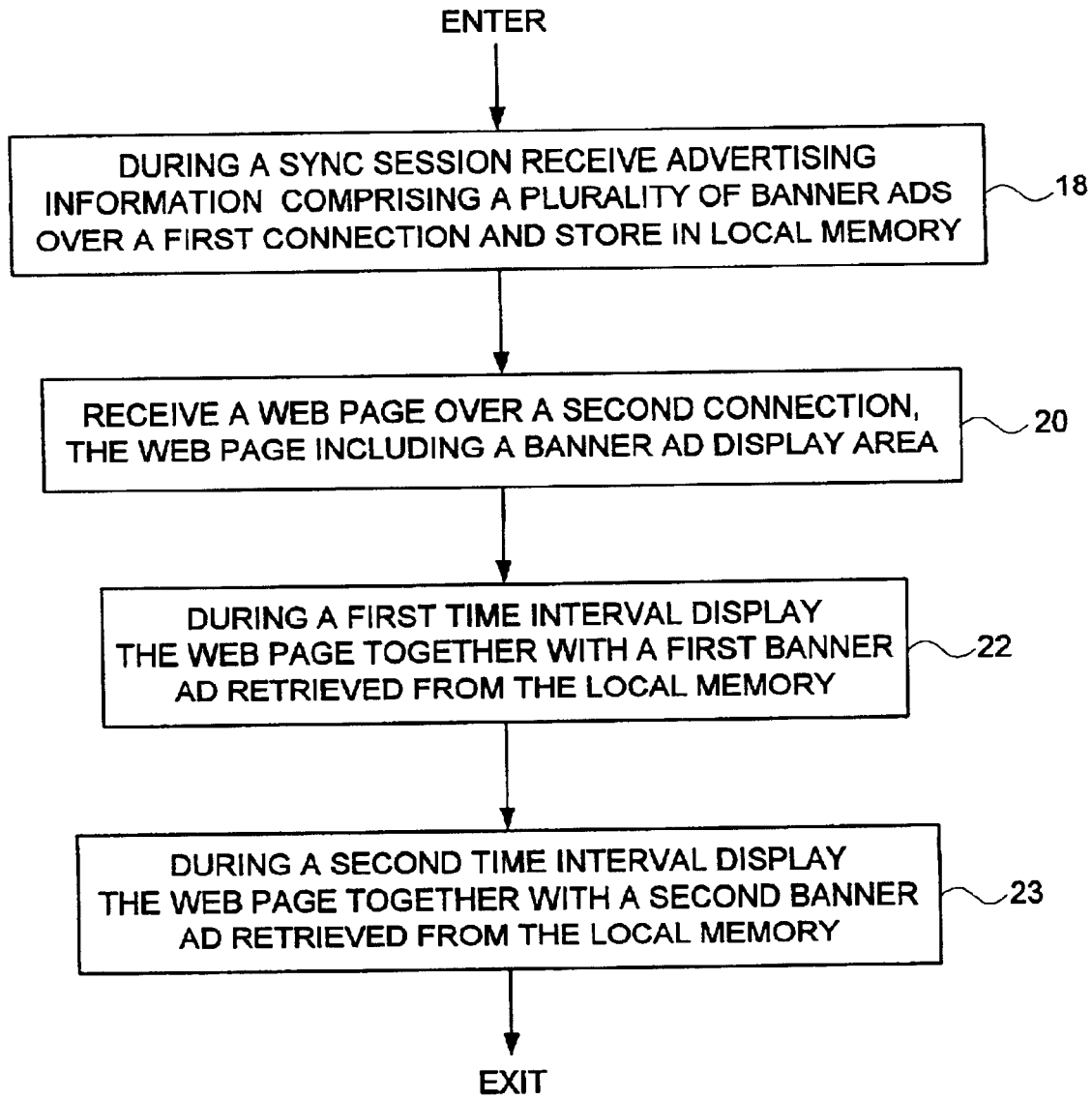
FIG. 4 is a flow chart according to an embodiment of the present invention illustrating how advertising information comprising a plurality of banner ads is received over a first connection during a synchronization session and stored in the local memory of the mobile terminal, and displayed during a browsing session with web page content received over a second connection.

FIG. 4 shows a flow chart according to an embodiment of the present invention illustrating a method of operating a mobile terminal comprising a local memory and a screen. During a synchronization session (at step 18) advertising information comprising a plurality of banner ads is received over a first connection and stored in the local memory of the mobile terminal. At step 20 a web page is received over a second connection, wherein the web page comprises web page content including a banner ad display area for displaying a banner ad. During a first time interval (at step 22), a first one of the banner ads is retrieved from the local memory and the web page content is displayed on the screen of the mobile terminal together with the first one of the banner ads in the banner ad display area. During a second time interval (at step 23), a second one of the banner ads is retrieved from the local memory and the web page content is displayed on the screen of the mobile terminal together with the second one of the banner ads in the banner ad display area.

In one embodiment, the first connection operates at a first bandwidth, the second connection operates at a second bandwidth, and the first bandwidth is substantially greater than the second bandwidth. For example, in one embodiment the first connection may be a wired connection, such as a local USB connection, and the second connection may be a wireless connection.

In one embodiment, the advertising information comprises advertising display criteria for displaying the advertising information within the web page content. For example, the advertising display criteria in one embodiment comprises a location within the web page content to display the advertising information, or the advertising display criteria may comprise a selection criteria for selecting a banner ad from the local memory. In another embodiment, the web page comprises the advertising display criteria for displaying the advertising information within the web page content. Any suitable method may be employed for incorporating the display criteria into the web page content, such as HTML or XML code. An example code segment incorporated into a web page is shown below:

```
<p align="center">
<a href="http://www.flowers.com">
<img src local="adv #5" border="0" width="468"
    height="60">
</a></p>
```

In the above code segment, the "align" tag specifies the banner ad is to be displayed with a center alignment. The "href" tag specifies the URL of the web page to display if the banner ad is clicked on. The "img src local" tag specifies that the banner ad image is stored locally on the mobile terminal as "adv #5". The "border", "width" and "height" tags specify the physical characteristics of the banner ad (in this example, no border, width of 468 pixels and height of 60 pixels). An alternative example code segment incorporated into a web page is shown below:

```
<p align="center">
<a href="http:/www.flowers.com">
<img src local="BUSINESS" border="0" width="468"
    height="60">
</a></p>
```

In this embodiment, the "img src local" tag specifies that the banner ad image is stored locally as type "BUSINESS". When processing this code, the mobile terminal will retrieve the next BUSINESS type banner ad in the rotation for display with the web page content. Yet another example code segment incorporated into a web page is shown below:

```
<p align="center">
<a href="http:/www.flowers.com">
<img src local="adv #5" border="0" width="468"
    height="60">
<img src="http://www.flowers.com/banner5.jpg" border=
    "0" width="468" height="60">
</a></p>
```

In this embodiment, the "img src" tag specifies an alternative source (e.g., URL) for the banner ad image for downloading from the Internet in the event the mobile terminal does not currently have "adv #5" stored in its local memory. This embodiment may also facilitate browsing devices that do not cache advertising information or cannot interpret the "img src local" tag.

In one embodiment, the banner ads stored in the local memory of the mobile terminal are displayed with the web page content in a predetermined rotation. For example, in one embodiment the banner ads are rotated each time the web page content is redisplayed. In another embodiment the banner ads are rotated at a predetermined interval while displaying the web page content.

Figure 5:
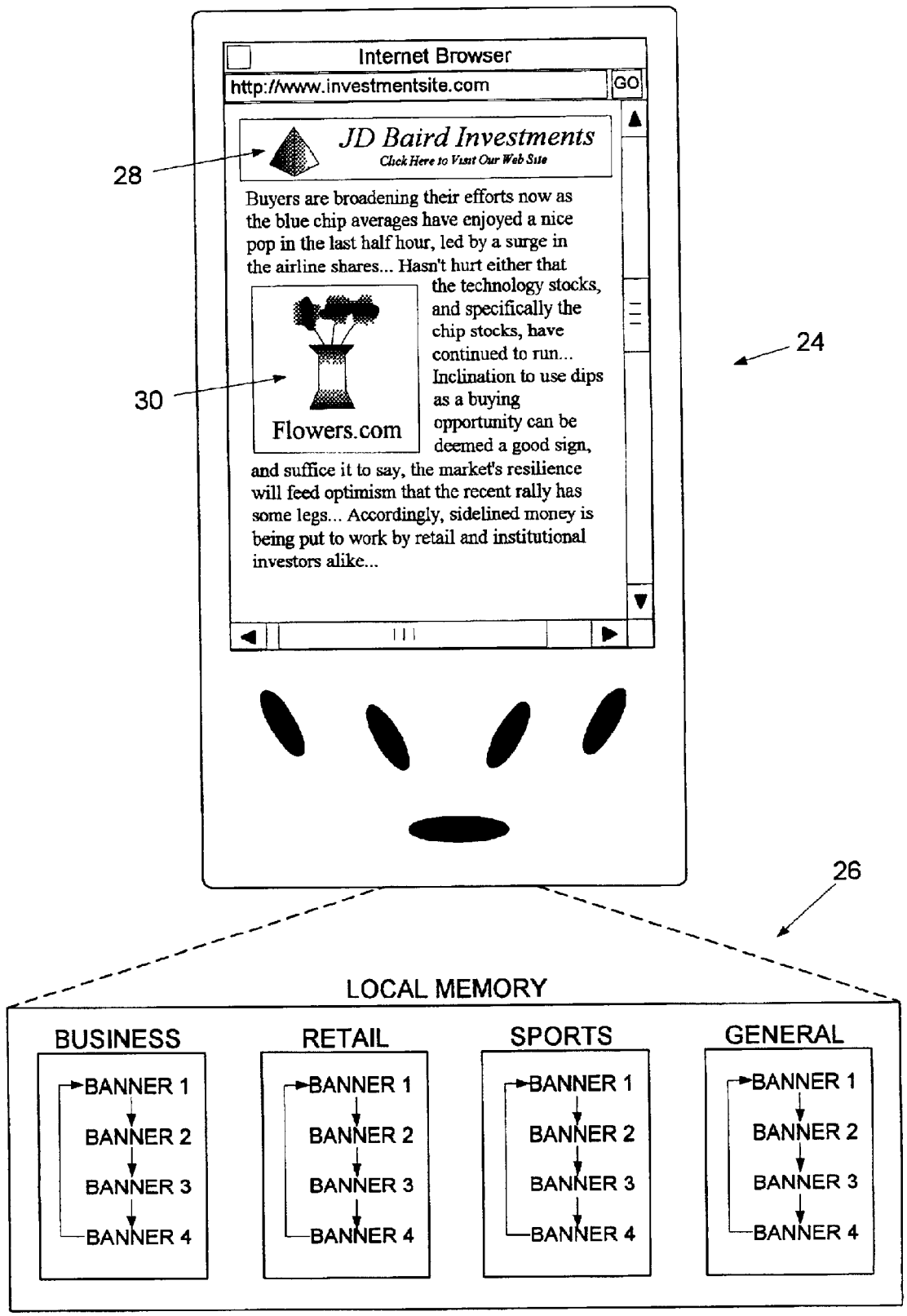
FIG. 5 shows a mobile terminal according to an embodiment of the present invention wherein the banner ads are stored in local memory by type (e.g., Business, Retail, etc.) and selected by type to be displayed with related web page content.

In yet another embodiment, a type indicator is associated with each banner ad, wherein the type indicator is used to select a banner ad from the local memory for display with the web page content. This embodiment is illustrated in FIG. 5 which shows a mobile terminal 24 comprising a local memory 26 for storing a plurality of banner ads by type. In the example of FIG. 5, the banner ads include four types: BUSINESS, RETAIL, SPORTS and GENERAL. When a page is displayed related to one of these areas of interest, a corresponding banner ad is selected from the appropriate category. For example, the mobile terminal 24 of FIG. 5 is displaying a web page from a finance web site. The web page indicates that the banner ad 28 at the top of the page should be of type "BUSINESS", and therefore the mobile terminal 24 retrieves a BUSINESS type banner ad from the local memory 26. The web page may indicate the second banner ad 30 is of type "GENERAL" meaning a GENERAL type banner ad should be displayed. In one embodiment, the banner ads for each type are rotated within each category as shown in FIG. 5.

Figure 6A:
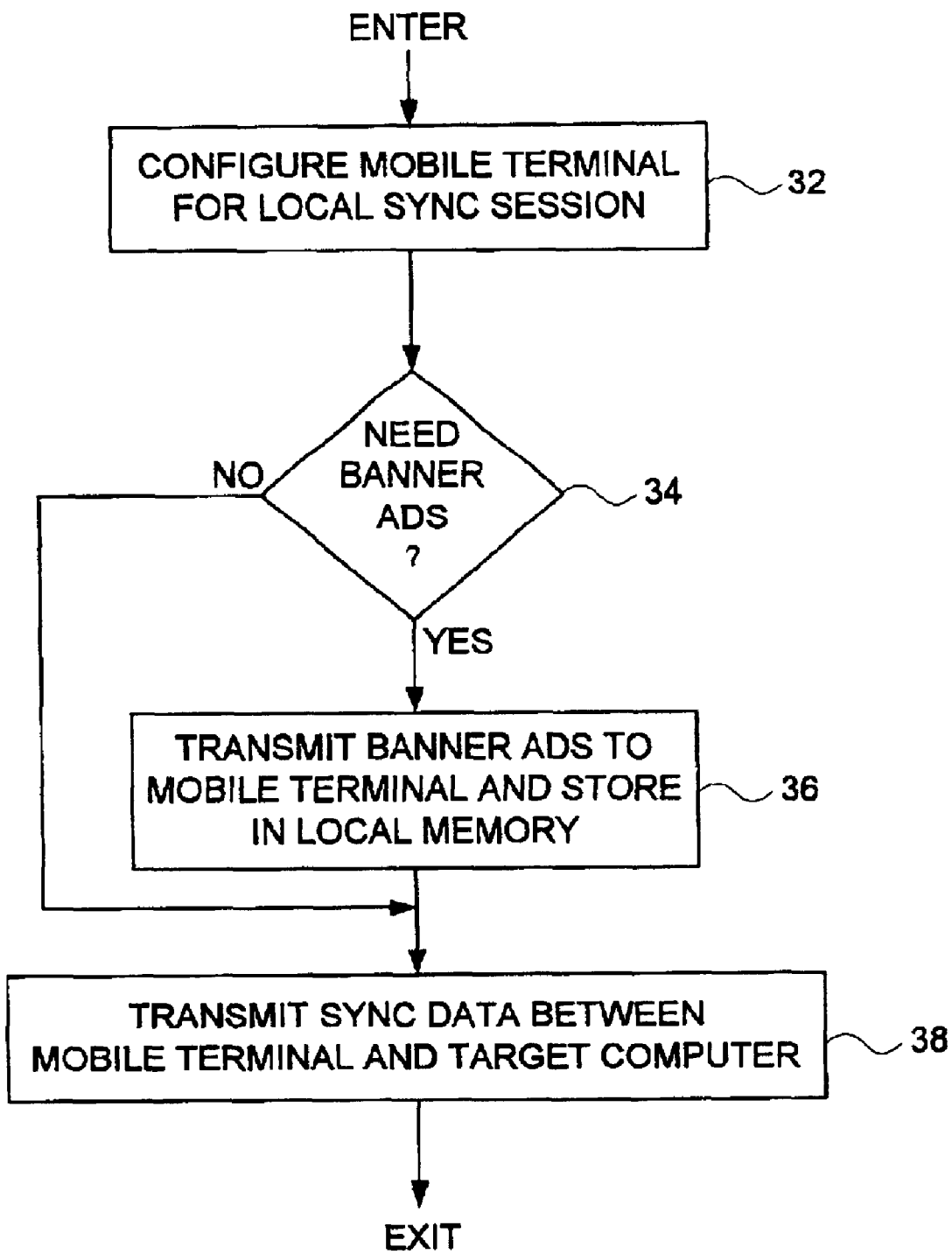
FIG. 6A is a flow chart according to an embodiment of the present invention illustrating how banner ads are cached within the mobile terminal while synchronizing locally over a high bandwidth connection (such as a local USB connection) to a target computer.

FIG. 6A is a flow chart according to an embodiment of the present invention illustrating how banner ads are stored in the mobile terminal while synchronizing locally over a high bandwidth connection (such as a local USB connection) to a target computer. At step 32 the mobile terminal is configured for a local synchronization session, and at step 34 the inventory of banner ads currently stored in the local memory of the mobile terminal is evaluated to determine whether the inventory should be updated. In one embodiment, the "expiratiotn" information for each banner ad is stored within the mobile terminal, and the mobile terminal determines when to update outdated banner ads with new banner ads. For example, a banner ad may expire after having been displayed a predetermined number of times, or after a predetermined date. In another embodiment, the target computer evaluates the inventory of banner ads stored in the mobile terminal to determine which banner ads should be replaced. At step 36 the new banner ads are transmitted from the target computer and stored in the local memory of the mobile terminal. At step 38, other synchronization data, such as updated personal information management (PIM) data, is exchanged between the mobile terminal and target computer as part of the synchronization session. In one embodiment, only advertising information is transmitted to the mobile terminal during the synchronization session.

Figure 6B:
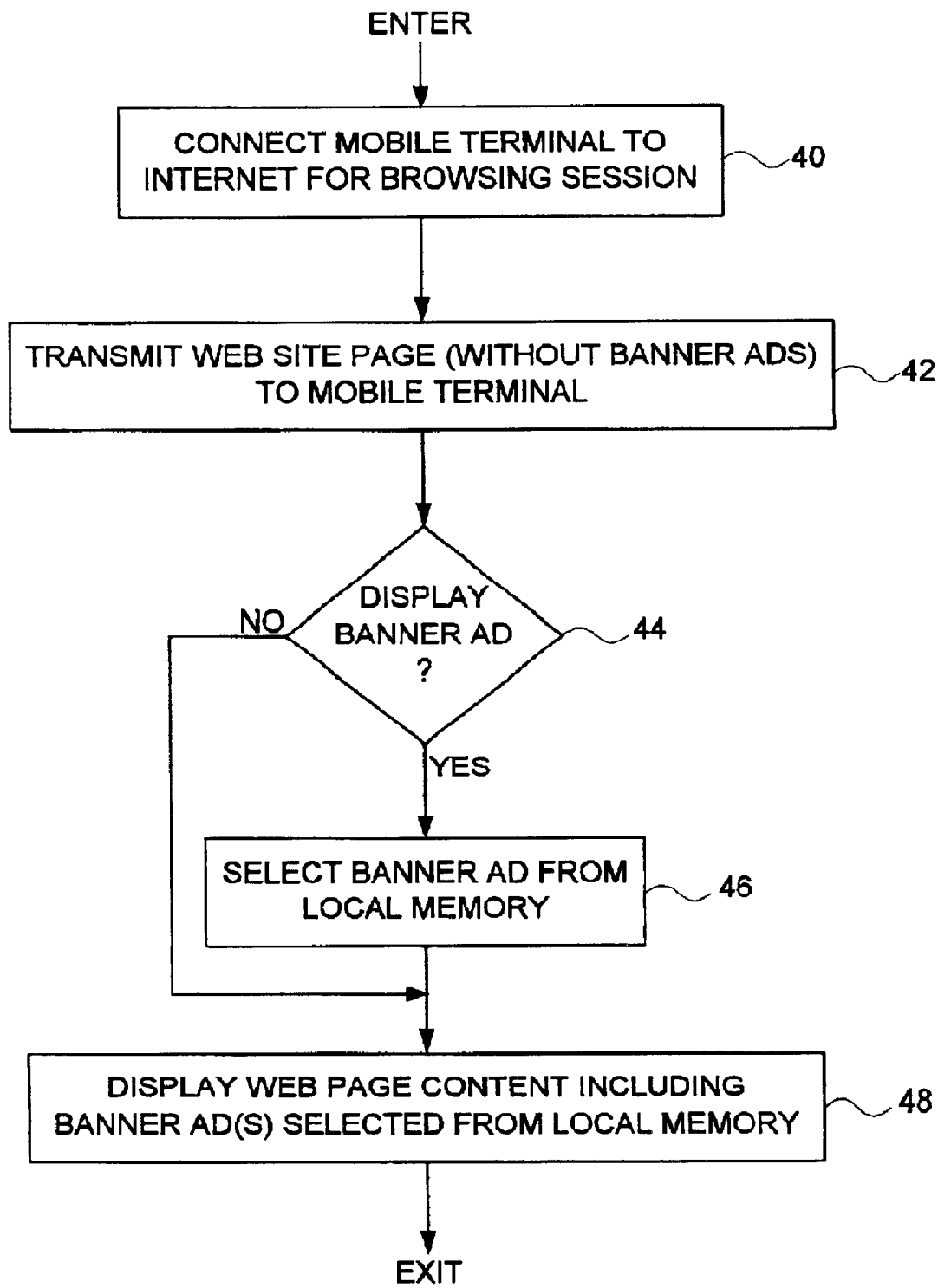
FIG. 6B is a flow chart according to an embodiment of the present invention illustrating how web pages are received over the second connection during a browsing session and displayed together with banner ads selected from the local memory.

FIG. 6B is a flow chart according to an embodiment of the present invention illustrating how a mobile terminal downloads web page content from the Internet during an on-line browsing session and selects the appropriate banner ads from local memory for viewing with the web page content. At step 40 the mobile terminal is connected to the Internet, for example over a wireless connection, to initiate the on-line browsing session. At step 42 a web page is transmitted to the mobile terminal without the images for at least one of the banner ads incorporated into the web page content. At step 44 the mobile terminal evaluates the web page to determine whether it contains a banner ad display area for displaying a banner ad that is stored in the local memory of the mobile terminal, and if so, at step 46 the banner ad is selected from the local memory. At step at 48 the web page content is displayed on the mobile terminal together with the banner ad selected from the local memory. This enhances the performance of the mobile terminal since retrieving the in banner ads from the local memory is much faster than downloading the banner ads from the Internet over a limited bandwidth communication channel.

The aspects of the present invention also improve the performance of a remote synchronization session to a target computer over a limited bandwidth communication channel. During the local synchronization session of FIG. 6A, the banner ads are transmitted and stored in the local memory of the mobile terminal. Because the bandwidth of the local communication channel (e.g., USB connection) is relatively wide, the banner ads are downloaded quickly into the mobile terminal. During a remote synchronization over a lower bandwidth communication channel (e.g., over a wireless connection), the web pages of interest are transmitted to the mobile terminal without the banner ad images, thereby reducing the time and cost to perform the remote synchronization. While the user is browsing off-line through the cached web pages, the appropriate banner ads are selected from the local memory for display with the web page content.

In one embodiment, during the synchronization session the banner ads are downloaded to the mobile terminal from selected web sites. In another embodiment, the banner ads are downloaded to the mobile terminal from a banner server of an advertising agency. The mobile terminal tracks which web pages are visited during on-line or off-line browsing sessions, together with which banner ads are selected from the local memory for display with the web page content. In one embodiment, the mobile terminal also tracks "click-through" rates for each banner ad. During a synchronization session, the tracking information is transmitted from the mobile terminal to the web site or banner server so that the appropriate billing information for each banner advertiser can be generated, as well as the commission payments for each of the web site content providers.

In one embodiment, the banner ads are linked to web pages that comprise information to the product or service being advertised. During the synchronization session, the linked web pages are transmitted to the mobile terminal over the first connection and stored in the local memory. During a browsing session, if the user clicks on a banner ad, the linked web page is retrieved from the local memory and displayed on the mobile terminal rather than downloading the linked web page from the Internet.

Figure 7A:
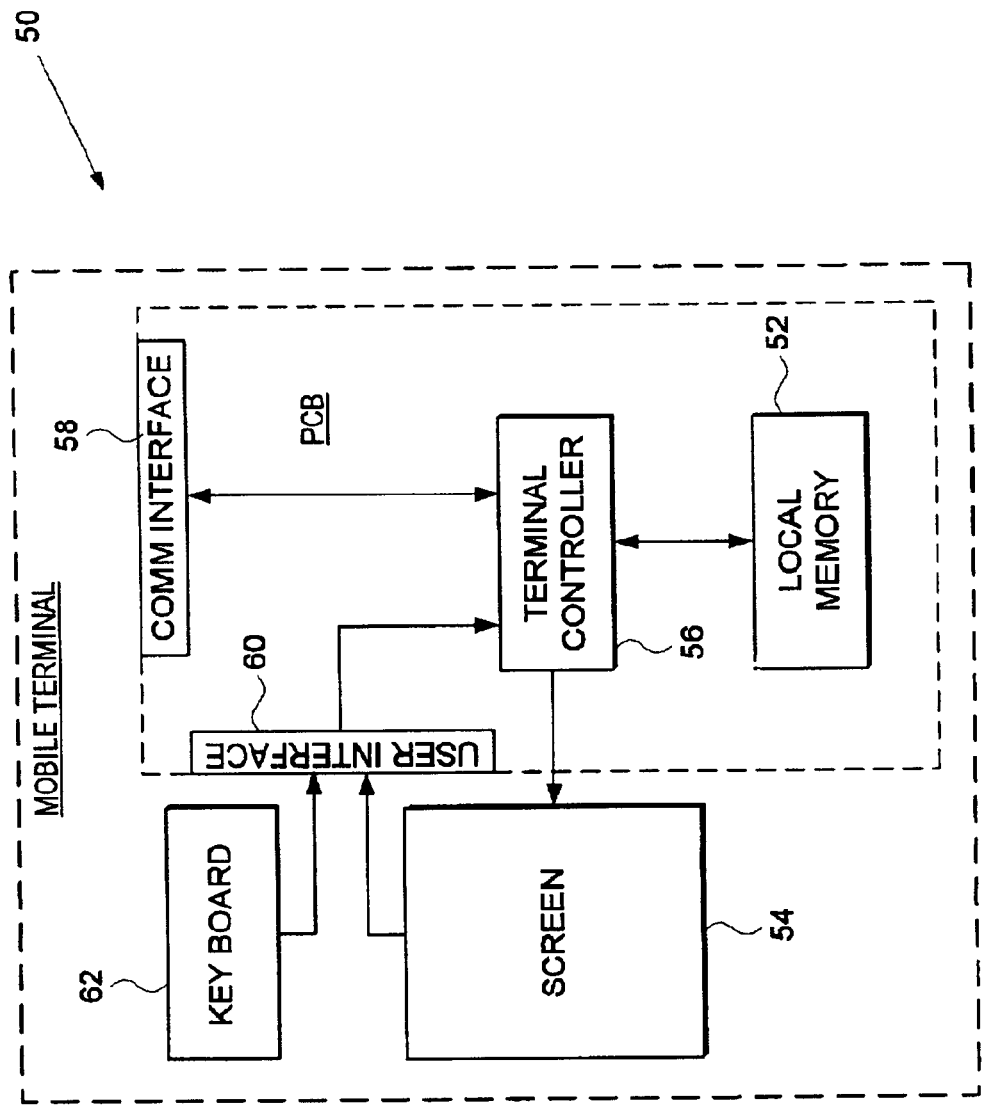
FIG. 7A shows a mobile terminal according to an embodiment of the present invention comprising a local memory for storing advertising information comprising a plurality of banner ads received over a first connection during a synchronization session and displayed during a browsing session with web page content received over a second connection.

FIG. 7A shows a mobile terminal 50 for communicating with a target computer according to an embodiment of the present invention. The mobile terminal 50 comprises a local memory 52 for storing advertising information comprising a plurality of banner ads received from the target computer over a first connection during a synchronization session. The mobile terminal 50 further comprises a screen 54 and a terminal controller 56. The terminal controller 56 for receiving a web page over a second connection, wherein the web page comprises web page content including a banner ad display area for displaying a banner ad. During a first time interval the terminal controller 56 retrieves a first one of the banner ads from the local memory and displays the web page content on the screen of the mobile terminal together with the first one of the banner ads in the banner ad display area. During a second time interval the terminal controller 56 retrieves a second one of the banner ads from the local memory and displays the web page content on the screen of the mobile terminal together with the second one of the banner ads in the banner ad display area.

Figure 7B:
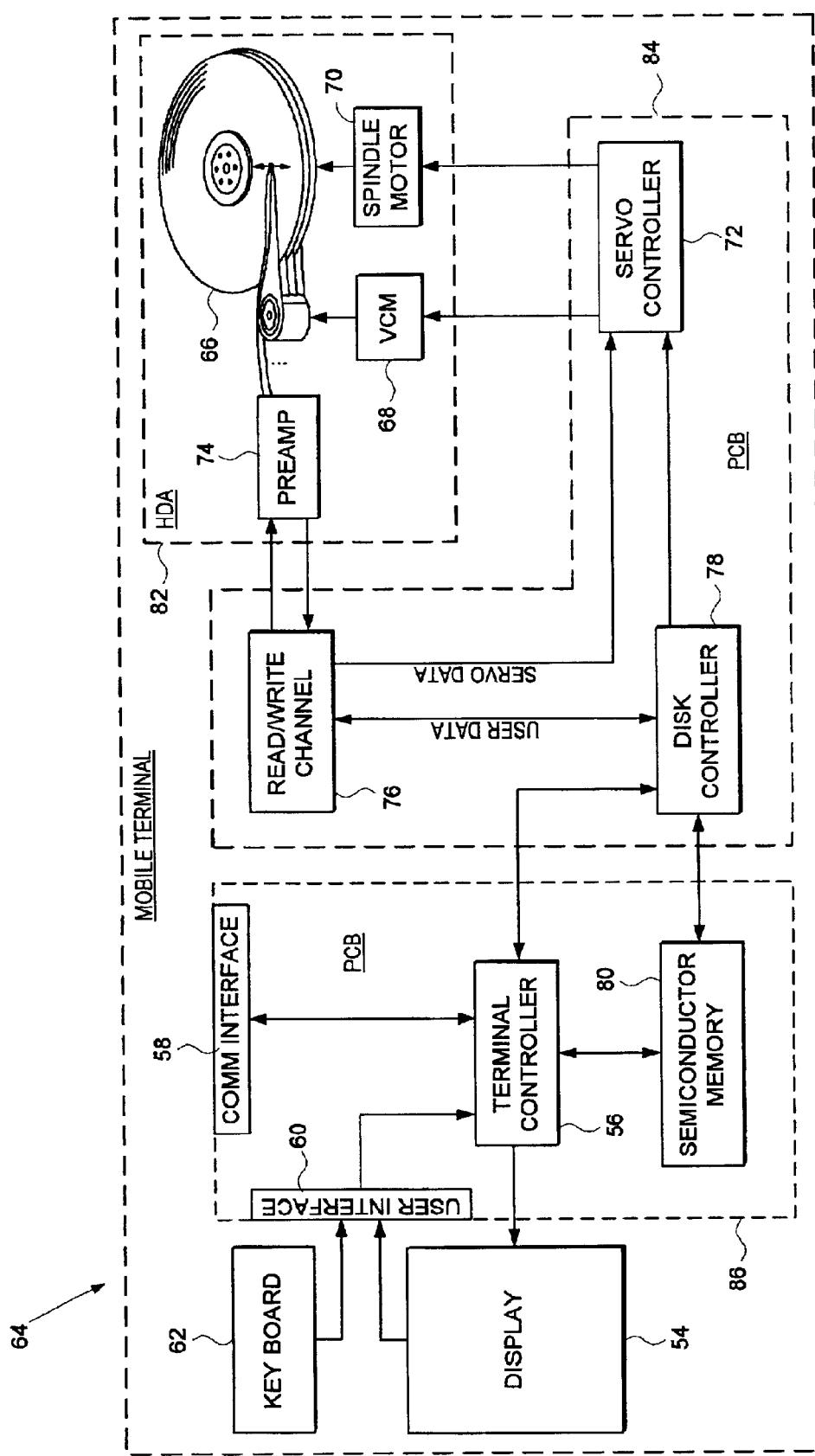
FIG. 7B shows a mobile terminal according to an embodiment of the present invention wherein the local memory comprises a disk.

FIG. 7B shows a mobile terminal 64 according to an embodiment of the present invention wherein the local memory comprises a disk 66. The mobile terminal 64 further comprises components for enabling the disk storage, including a voice coil motor (VCM) 68 and spindle motor 70, a servo controller 72, a preamp 74, a read/write channel 76, and a disk controller 78. In the embodiment of FIG. 7B, the mobile terminal 64 comprises semiconductor memory 80 that is shared by the terminal controller 56 and disk controller 78 to reduce the cost of the mobile terminal 64. In another embodiment, the terminal controller 56 executes a disk caching algorithm for caching data read from and written to the disk 66. In the embodiment of FIG. 7B, the disk 66, VCM 68, spindle motor 70 and preamp 74 are implemented within a head disk assembly (HDA) 82, the servo controller 72, read/write channel 76 and disk controller 78 are implemented on a first printed circuit board (PCB) 84, and the terminal controller 56 and semiconductor memory 80 are implemented on a second PCB 86. In an alternative embodiment, the servo controller 72, read/write channel 76, disk controller 78, terminal controller 56, and semiconductor memory 80 are implemented on a single PCB.

In one embodiment, the local memory of the mobile terminal (e.g., the disk 66 in FIG. 7B) stores a computer program comprising a code segment for receiving advertising information comprising a plurality of banner ads over a first connection during a synchronization session and storing the advertising information in the local memory of the mobile terminal. The computer program further comprises a code segment for receiving a web page over a second connection, wherein the web page comprises web page content including a banner ad display area for displaying a banner ad. The computer program further comprises a code segment for retrieving a first one of the banner ads from the local memory and displaying the web page content on the screen of the mobile terminal together with the first one of the banner ads in the banner ad display area during a first time interval, and retrieving a second one of the banner ads from the local memory and displaying the web page content on the screen of the mobile terminal together with the second one of the banner ads in the banner ad display area during a second time interval.

We claim:

1. A method of operating a mobile terminal comprising a local memory and a screen, the method comprising the steps of:
   (a) during a synchronization session, receiving advertising information comprising a plurality of banner ads over a first connection and storing the advertising information in the local memory of the mobile terminal;
   (b) receiving a web page over a second connection, wherein the web page comprises web page content including a banner ad display area for displaying a banner ad;
   (c) during a first time interval, retrieving a first one of the banner ads from the local memory and displaying the web page content on the screen of the mobile terminal together with the first one of the banner ads in the banner ad display area; and
   (d) during a second time interval retrieving a second one of the banner ads from the local memory and displaying the web page content on the screen of the mobile terminal together with the second one of the banner ads in the banner ad display area.

2. The method as recited in claim 1, wherein:
   (a) the first connection operates at a first bandwidth;
   (b) the second connection operates at a second bandwidth; and
   (c) the first bandwidth is substantially greater than the second bandwidth.

3. The method as recited in claim 2, wherein:
   (a) the first connection comprises a wired connection; and
   (b) the second connection comprises a wireless connection.

4. The method as recited in claim 1, wherein the advertising information comprises advertising display criteria for displaying the advertising information within the web page content.

5. The method as recited in claim 4, wherein the advertising display criteria comprises a location within the web page content to display the advertising information.

6. The method as recited in claim 4, wherein the advertising display criteria comprises a selection criteria for selecting one of the banner ads from the local memory.

7. The method as recited in claim 1, wherein the web page further comprises advertising display criteria for displaying the advertising information within the web page content.

8. The method as recited in claim 7, wherein the advertising display criteria comprises a location within the web page content to display the advertising information.

9. The method as recited in claim 7, wherein the advertising display criteria comprises a selection criteria for selecting one of the banner ads from the local memory.

10. The method as recited in claim 1, wherein the banner ads are displayed with the web page content in a predetermined rotation.

11. The method as recited in claim 10, wherein the banner ads are rotated each time the web page content is redisplayed.

12. The method as recited in claim 10, wherein the banner ads are rotated at a predetermined interval while displaying the web page content.

13. The method as recited in claim 1, wherein:
   (a) a type indicator is associated with each banner ad; and
   (b) the type indicator is used to select a banner ad from the local memory for display with the web page content.

14. The method as recited in claim 1, wherein during the synchronization session personal information management (PIM) data is transmitted to the remote terminal.

15. The method as recited in claim 1, wherein the web page is transmitted to the mobile terminal over the second connection during a subsequent synchronization session.

16. The method as recited in claim 1, wherein the web page is transmitted to the mobile terminal over the second connection during a browsing session.

17. The method as recited in claim 1, further comprising the steps of:
   (a) evaluating the inventory of advertising information stored in the local memory of the mobile terminal; and
   (b) selectively transmitting updated advertising information to the mobile terminal relative to the inventory of advertising information stored in the local memory of the mobile terminal.

18. The method as recited in claim 17, wherein the updated advertising information displaces outdated advertising information stored on the mobile terminal.

19. The method as recited in claim 1, further comprising the steps of:
   (a) storing in the local memory of the mobile terminal tracking information identifying the advertising information retrieved from the local memory and displayed with the web page content; and
   (b) transmitting the tracking information from the mobile terminal to a target computer.

20. The method as recited in claim 19, wherein the tracking information further comprises click-through data indicating a click-through rate for the advertising information displayed with the web page content.

21. The method as recited in claim 1, wherein:
   (a) the advertising information comprises linked web pages, and
   (b) during the synchronization session, the linked web pages are transmitted to the mobile terminal over the first connection and stored in the local memory.

22. A mobile terminal for communicating with a target computer, the mobile terminal comprising:
   (a) a local memory for storing advertising information comprising a plurality of banner ads received from the target computer over a first connection during a synchronization session;
   (b) a screen; and
   (c) a terminal controller for:
      receiving a web page over a second connection, wherein the web page comprises web page content including a banner ad display area for displaying a banner ad;

during a first time interval, retrieving a first one of the banner ads from the local memory and displaying the web page content on the screen of the mobile terminal together with the first one of the banner ads in the banner ad display area; and during a second time interval, retrieving a second one of the banner ads from the local memory and displaying the web page content on the screen of the mobile terminal together with the second one of the banner ads in the banner ad display area.

23. The mobile terminal as recited in claim 22, wherein:
(a) the first connection operates at a first bandwidth;
(b) the second connection operates at a second bandwidth; and
(c) the first bandwidth is substantially greater than the second bandwidth.

24. The mobile terminal as recited in claim 23, wherein:
(c) the first connection comprises a wired connection; and
(d) the second connection comprises a wireless connection.

25. The mobile terminal as recited in claim 22, wherein the advertising information comprises advertising display criteria for displaying the advertising information within the web page content.

26. The mobile terminal as recited in claim 25, wherein the advertising display criteria comprises a location within the web page content to display the advertising information.

27. The mobile terminal as recited in claim 25, wherein the advertising display criteria comprises a selection criteria for selecting one of the banner ads from the local memory.

28. The mobile terminal as recited in claim 22, wherein the web page further comprises advertising display criteria for displaying the advertising information within the web page content.

29. The mobile terminal as recited in claim 28, wherein the advertising display criteria comprises a location within the web page content to display the advertising information.

30. The mobile terminal as recited in claim 28, wherein the advertising display criteria comprises a selection criteria for selecting one of the banner ads from the local memory.

31. The mobile terminal as recited in claim 22, wherein the banner ads are displayed with the web page content in a predetermined rotation.

32. The mobile terminal as recited in claim 31, wherein the banner ads are rotated each time the web page content is redisplayed.

33. The mobile terminal as recited in claim 31, wherein the banner ads are rotated at a predetermined interval while displaying the web page content.

34. The mobile terminal as recited in claim 22, wherein:
(c) a type indicator is associated with each banner ad; and
(d) the type indicator is used to select a banner ad from the local memory for display with the web page content.

35. The mobile terminal as recited in claim 22, wherein during the synchronization session the mobile terminal receives personal information management (PIM) data from the target computer over the first connection.

36. The mobile terminal as recited in claim 22, wherein the web page is transmitted to the mobile terminal over the second connection during a subsequent synchronization session.

37. The mobile terminal as recited in claim 22, wherein the web page is transmitted to the mobile terminal over the second connection during a browsing session.

38. The mobile terminal as recited in claim 22, wherein:
(a) during the synchronization session the inventory of advertising information stored in the local memory of the mobile terminal is evaluated; and (b) updated advertising information is selectively transmitted to the mobile terminal relative to the inventory of advertising information stored in the local memory of the mobile terminal.

39. The mobile terminal as recited in claim 38, wherein the updated advertising information displaces outdated advertising information stored on the mobile terminal.

40. The mobile terminal as recited in claim 22, wherein the terminal controller for:
(a) storing in the local memory of the mobile terminal tracking information identifying the advertising information retrieved from the local memory and displayed with the web page content; and
(b) transmitting the tracking information from the mobile terminal to a target computer.

41. The mobile terminal as recited in claim 40, wherein the tracking information further comprises click-through data indicating a click-through rate for the advertising information displayed with the web page content.

42. The mobile terminal as recited in claim 22, wherein:
(a) the advertising information comprises linked web pages; and
(b) during the synchronization session, the linked web pages are transmitted to the mobile terminal over the first connection and stored in the local memory.

43. A computer program embodied on a computer readable storage medium for use in a mobile terminal comprising a local memory and a screen, the computer program comprising code segments for:
(a) during a synchronization session, receiving advertising information comprising a plurality of banner ads over a first connection and storing the advertising information in the local memory of the mobile terminal;
(b) receiving a web page over a second connection, wherein the web page comprises web page content including a banner ad display area for displaying a banner ad;
(c) during a first time interval, retrieving a first one of the banner ads from the local memory and displaying the web page content on the screen of the mobile terminal together with the first one of the banner ads in the banner ad display area; and
(d) during a second time interval, retrieving a second one of the banner ads from the local memory and displaying the web page content on the screen of the mobile terminal together with the second one of the banner ads in the banner ad display area.

44. The computer program as recited in claim 43, wherein:
(a) the first connection operates at a first bandwidth;
(b) the second connection operates at a second bandwidth; and
(c) the first bandwidth is substantially greater than the second bandwidth.

45. The computer program as recited in claim 44, wherein:
(a) the first connection comprises a wired connection; and
(b) the second connection comprises a wireless connection.

46. The computer program as recited in claim 43, wherein the advertising information comprises advertising display criteria for displaying the advertising information within the web page content.

47. The computer program as recited in claim 46, wherein the advertising display criteria comprises a location within the web page content to display the advertising information.

48. The computer program as recited in claim 46, wherein the advertising display criteria comprises a selection criteria for selecting one of the banner ads from the local memory.

49. The computer program as recited in claim 43, wherein the web page further comprises advertising display criteria for displaying the advertising information within the web page content.

50. The computer program as recited in claim 49, wherein the advertising display criteria comprises a location within the web page content to display the advertising information.

51. The computer program as recited in claim 49, wherein the advertising display criteria comprises a selection criteria for selecting one of the banner ads from the local memory.

52. The computer program as recited in claim 43, wherein the banner ads are displayed with the web page content in a predetermined rotation.

53. The computer program as recited in claim 52, wherein the banner ads are rotated each time the web page content is redisplayed.

54. The computer program as recited in claim 52, wherein the banner ads are rotated at a predetermined interval while displaying the web page content.

55. The computer program as recited in claim 43, wherein:

(a) a type indicator is associated with each banner ad; and (b) the type indicator is used to select a banner ad from the local memory for display with the web page content.

56. The computer program as recited in claim 43, wherein during the synchronization session personal information management (PIM) data is transmitted to the remote terminal.

57. The computer program as recited in claim 43, wherein the web page is transmitted to the mobile terminal over the second connection during a subsequent synchronization session.

58. The computer program as recited in claim 43, wherein the web page is transmitted to the mobile terminal over the second connection during a browsing session.

59. The computer program as recited in claim 43, further comprising code segments for:

(a) evaluating the inventory of advertising information stored in the local memory of the mobile terminal; and (b) selectively transmitting updated advertising information to the mobile terminal relative to the inventory of advertising information stored in the local memory of the mobile terminal.

60. The computer program as recited in claim 59, wherein the updated advertising information displaces outdated advertising information stored on the mobile terminal.

61. The computer program as recited in claim 43, further comprising code segments for:

(a) storing in the local memory of the mobile terminal tracking information identifying the advertising information retrieved from the local memory and displayed with the web page content; and (b) transmitting the tracking information from the mobile terminal to a target computer.

62. The computer program as recited in claim 61, wherein the tracking information further comprises click-through data indicating a click-through rate for the advertising information displayed with the web page content.

63. The computer program as recited in claim 43, wherein:

(a) the advertising information comprises linked web pages; and (b) during the synchronization session, the linked web pages are transmitted to the mobile terminal over the first connection and stored in the local memory.

64. A method of transmitting data to a mobile terminal, the mobile terminal comprising a local memory and a screen, the method comprising the steps of:

(a) during a synchronization session, transmitting advertising information comprising a plurality of banner ads to the mobile terminal over a first connection, wherein the local memory of the mobile terminal is for storing the advertising information; and (b) transmitting a web page to the mobile terminal over a second connection, wherein:

the web page comprises web page content including a banner ad display area;

the screen of the mobile terminal is for displaying the web page content; and the banner ad display area is for displaying a first one of the banner ads retrieved from the local memory of the mobile terminal during a first time interval and for displaying a second one of the banner ads retrieved from the local memory of the mobile terminal during a second time interval.

65. A computer program embodied on a computer readable storage medium for transmitting data to a mobile terminal, the mobile terminal comprising a local memory and a screen, the computer program comprising code segments for:

(a) during a synchronization session, transmitting advertising information comprising a plurality of banner ads to the mobile terminal over a first connection, wherein the local memory of the mobile terminal is for storing the advertising information; and (b) transmitting a web page to the mobile terminal over a second connection, wherein:

the web page comprises web page content including a banner ad display area;

the screen of the mobile terminal is for displaying the web page content; and the banner ad display area is for displaying a first one of the banner ads retrieved from the local memory of the mobile terminal during a first time interval and for displaying a second one of the banner ads retrieved from the local memory of the mobile terminal during a second time interval.

* * * * *

UNITED STATES PATENT AND TRADEMARK OFFICE
CERTIFICATE OF CORRECTION

PATENT NO. : 6,826,614 B1
DATED : November 30, 2004
INVENTOR(S) : Hanmann et al.

It is certified that error appears in the above-identified patent and that said Letters Patent is hereby corrected as shown below:

<u>Title page,</u>
Item [75], Inventors, delete "Anil Sareem" and replace therefore with -- Anil Sareen --.

Signed and Sealed this

First Day of November, 2005

JON W. DUDAS
*Director of the United States Patent and Trademark Office*